UNITED STATES PATENT OFFICE.

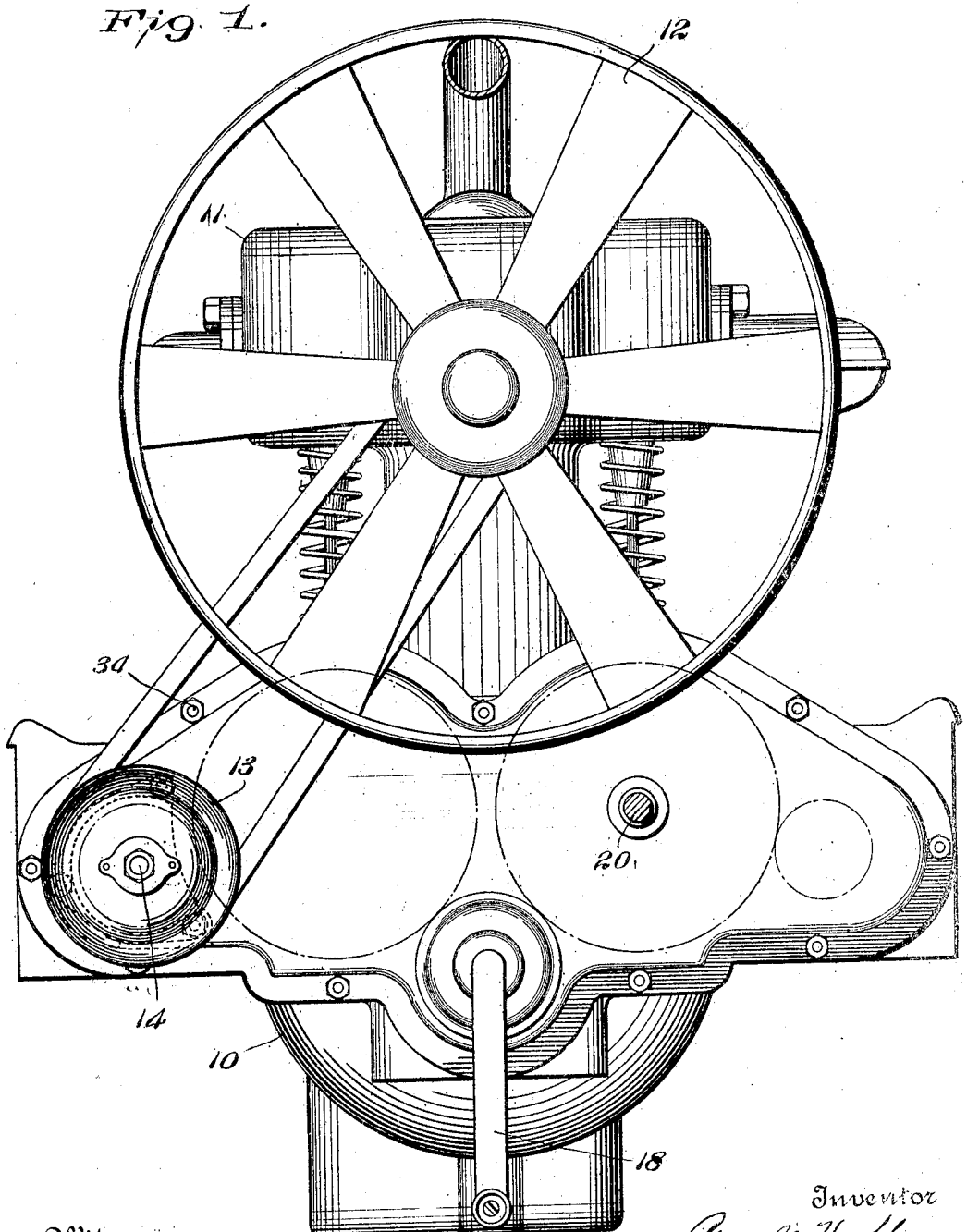

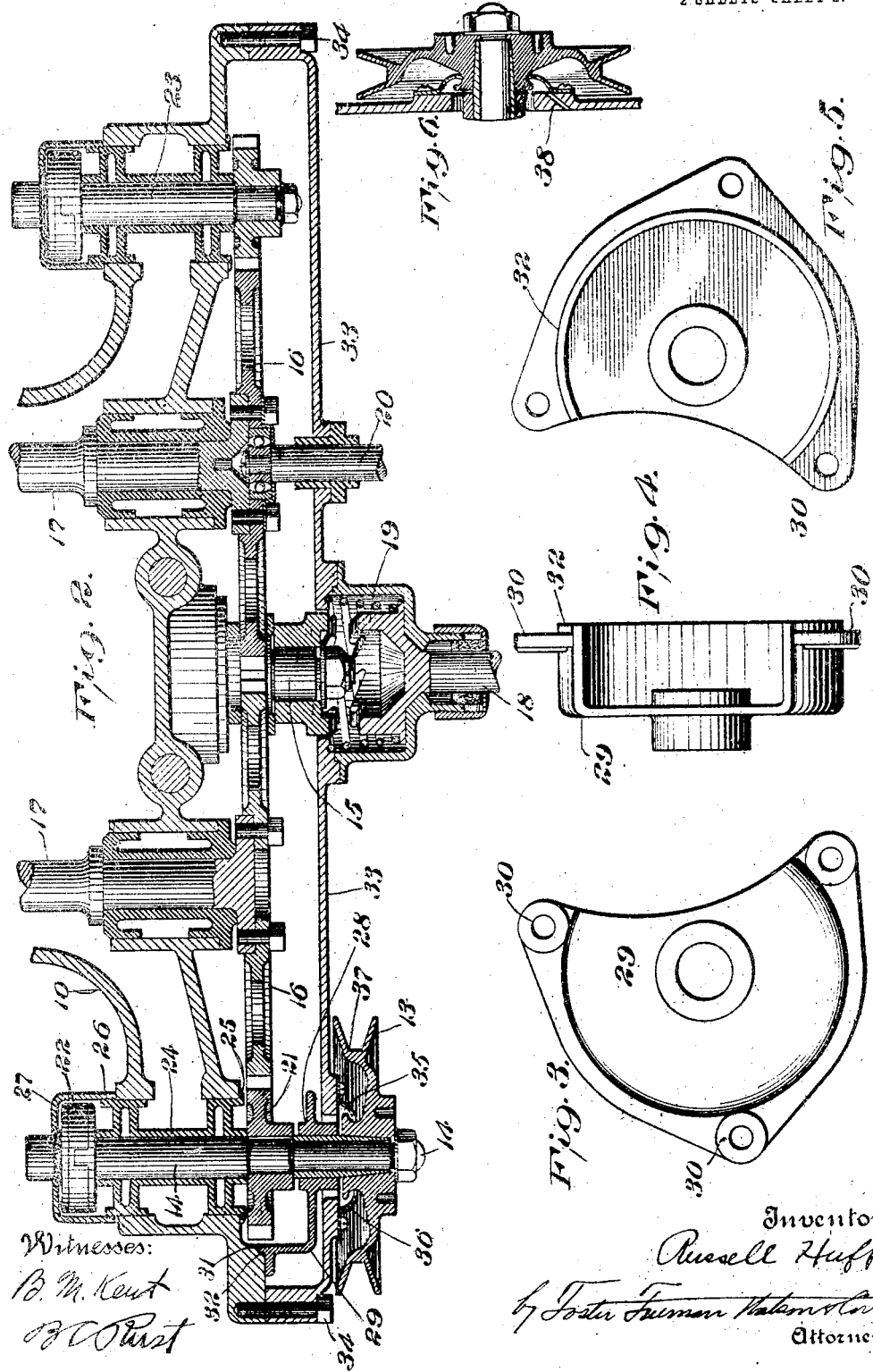

RUSSELL HUFF, OF DETROIT, MICHIGAN, ASSIGNOR TO PACKARD MOTOR CAR COMPANY, OF DETROIT, MICHIGAN, A CORPORATION OF MICHIGAN.

HYDROCARBON-MOTOR.

1,104,423.  Specification of Letters Patent.  Patented July 21, 1914.

Application filed July 13, 1911. Serial No. 638,363.

*To all whom it may concern:*

Be it known that I, RUSSELL HUFF, a citizen of the United States, and resident of Detroit, in the county of Wayne, State of Michigan, have invented certain new and useful Improvements in Hydrocarbon-Motors, of which the following is a specification.

This invention relates to hydrocarbon motors and more particularly to the mounting of the auxiliary shafts in the crank case.

One of the objects of the invention is to provide bearings for the auxiliary shafts which are provided on one end with a flange engaging the end of the crank case and which are provided on the opposite end with a cap having screw-threaded engagement with the bearing and forming an inclosure for the auxiliary shaft coupling.

Another object of the invention is to provide an additional bearing for supporting the outer end of one of the auxiliary shafts.

A further object is to provide novel means for collecting oil from one of the auxiliary shafts and delivering the same to the gear casing.

Other objects and the features of novelty will be apparent from the following description taken in connection with the accompanying drawings, in which:

Figure 1 is an end view of a motor provided with my invention. Fig. 2 is a transverse section of the motor on a line through the cam shafts and auxiliary shafts. Fig. 3 is an exterior view of the bearing for supporting the outer end of one of the auxiliary shafts; Fig. 4 is a side view, and Fig. 5 is an interior view thereof; Fig. 6 is a vertical section through the auxiliary shaft pulley showing the means for draining the oil into the gear case.

The motor is provided with a crank case 10 having cylinders 11 mounted thereon. On the front of one of the cylinders is a fan 12 driven by means of a belt from a pulley 13 mounted on an auxiliary shaft 14. A crank shaft 15 is mounted in the crank case and is provided with a pinion meshing with gears 16 on the cam shafts 17. The motor is provided with a starting crank 18 which is adapted to engage the crank shaft 15 by means of the clutch 19. One of the cam shafts is connected with an axially extending shaft 20 for the purpose of moving the cam shaft in the direction of its axis in order to relieve the compression when starting the motor. The gear 16 on one of the cam shafts meshes with a gear 21 on the auxiliary shaft 14. This shaft is provided at one end with a coupling 22 for driving the water pump or the magneto. The auxiliary shaft 23 on the opposite side of the engine is provided with a similar coupling and, with the exception of not having the extension for the pulley 13, is arranged in the same manner as the shaft 14, and therefore, a detail description of the same will not be necessary in addition to the description of the arrangement of the shaft 14 which will now be given.

A bearing 24 is mounted in the crank case 10 and is provided at its outer end with a flange 25 engaging the end of the crank case. The opposite end of the bearing projects through the crank case and is screw-threaded as indicated by the numeral 26. A cap 27 incloses the coupling 22 and has screw-threaded engagement with the bearing 24 and also engages the crank case, whereby the cap serves as a nut to rigidly hold the bearing 24 in position. The outer end of the shaft 14 has an extension, which is provided with a bearing 28, and has secured on its end the pulley 13. The bearing 28 is provided with a cup-shaped flange 29 which surrounds the greater portion of the gear 21 and is secured to the crank case by means of bolts engaging the lugs 30. A recess 31 of circular form is provided in the end of the crank case and receives the annular projection 32 on the flange 29. By this construction the bearing 28 is rigidly secured to the crank case and the projecting end of the shaft 14 is held against lateral movement due to the pull of the belt on the pulley 13. The gear 21 is also positively held in alinement with the gear 16.

The gears for driving the cam shafts and auxiliary shafts, from the crank shaft, are inclosed by a casing 33, which is bolted to the crank case along its marginal portion by means of bolts 34. The pulley 13 is provided at the inner end of the hub with an annular flange 35 for throwing oil from the shaft 14.

A ring 36, having a cupped portion surrounding the flange 35, and having a flange portion secured to the casing 33 by screws 37 or other suitable means, is provided for the purpose of catching the oil thrown by the flange 35. It will be seen that this ring, with the adjoining portion of the casing, forms a recess, the bottom of which is provided with a drain 38 which conveys the oil from the recess to the interior of the casing. By the provision of the above described means for catching the oil there is no liability for oil to work out to the flange of the pulley and onto the belt or being thrown onto the adjacent portions of the motor.

Having thus described my invention what I claim as new and desire to secure by Letters-Patent is:

1. In a hydrocarbon engine, in combination, a casing, a crank shaft, an auxiliary shaft driven from the crank shaft and provided on one end with a coupling, a bearing for said auxiliary shaft provided at one end with means engaging said casing, and a cap for inclosing said coupling and secured to the other end of said bearing and engaging said casing, whereby said bearing is rigidly held in said casing.

2. In a hydrocarbon engine, in combination, a casing, a crank shaft, an auxiliary shaft driven from the crank shaft and provided on one end with a coupling, a bearing for said auxiliary shaft having a flange at one end engaging said casing, and a cap inclosing said coupling and having threaded engagement with the other end of said bearing and engaging said casing, whereby said bearing is rigidly held in said casing.

3. In a hydrocarbon motor, in combination, a casing, a crank shaft, an auxiliary shaft, a gear on said auxiliary shaft driven from said crank shaft, and bearings for said auxiliary shaft on opposite sides of said gear, one of said bearings being mounted in said casing and the other of said bearings being secured to the exterior of said casing.

4. In a hydrocarbon engine, a casing, a shaft supported by said casing and having one end projecting outwardly therefrom, a gear mounted on the projecting end of said shaft, a second gear meshing with said gear and a bearing for the projecting end of said shaft provided with a cup-shaped supporting flange secured to said casing and engaging a recess in said casing, said flange inclosing the gear on said shaft and having an opening at one side to permit the engagement of said gears.

5. In a hydrocarbon motor, a crank case, a crank shaft mounted in the crank case, an auxiliary shaft, gears for driving said auxiliary shaft from the crank shaft, a pulley on said auxiliary shaft provided with a flange adapted to intercept and remove oil from said shaft, and a ring surrounding said flange and adapted to receive the oil therefrom.

6. In a hydrocarbon motor, a crank case, a crank shaft mounted in the crank case, an auxiliary shaft, gears for driving said auxiliary shaft from the crank shaft, a casing for said gears, a pulley on said auxiliary shaft provided with a flange adapted to intercept and remove oil from said shaft, and a ring secured to said casing and forming therewith a recess adapted to receive oil from said flange, said recess being provided with means for draining oil therefrom.

7. In a hydrocarbon motor, the combination with the crank case, the crank shaft therein, an auxiliary shaft, and gears connecting the crank shaft and the auxiliary shaft, of a cooling fan mounted on the motor, belt driving means for the fan from the auxiliary shaft, and bearings for the auxiliary shaft on both sides of the gear thereon.

In testimony whereof I affix my signature in presence of two witnesses.

RUSSELL HUFF.

Witnesses:
W. H. FINCKEL, Jr.,
E. S. KIEHNE.